United States Patent [19]
Arreola et al.

[11] Patent Number: 5,624,127
[45] Date of Patent: Apr. 29, 1997

[54] STEPPING STRUCTURE FOR VEHICLES AND METHOD OF USE

[76] Inventors: Byron A. Arreola, 2324 W. Michelle Dr., Phoenix, Ariz. 85023; Peter D. Braden, 7437 E. Halifax Cir., Mesa, Ariz. 85207; Cesar A. Arreola, 2101 W. Morningside Dr., Phoenix, Ariz. 85023

[21] Appl. No.: 409,411

[22] Filed: Mar. 24, 1995

[51] Int. Cl.⁶ ........................................................ B60R 3/02
[52] U.S. Cl. ............................................. 280/163; 182/127
[58] Field of Search ............................. 280/163, 164.1, 280/164.2, 166, 169; 105/444, 445, 446, 447, 448, 449, 450; 296/61, 62; 182/36, 58, 60, 88, 91, 95, 127, 97, 86

[56] References Cited

U.S. PATENT DOCUMENTS

| | | | |
|---|---|---|---|
| 655,923 | 8/1900 | Dutton | 182/97 |
| 2,059,240 | 11/1936 | Johnston | 182/97 |
| 3,067,835 | 12/1962 | Valley | 182/95 |
| 5,366,052 | 11/1994 | Keh-Lin | 182/88 |
| 5,505,476 | 4/1996 | Maccabee | 280/163 |

FOREIGN PATENT DOCUMENTS 847204  7/1970  Canada .................................. 280/166

*Primary Examiner*—Richard M. Camby
*Assistant Examiner*—Frank Vanaman
*Attorney, Agent, or Firm*—Harry M. Weiss; Jeffrey D. Moy; Harry M. Weiss & Associates, P.C.

[57] ABSTRACT

A stepping structure for entering and leaving a vehicle such as a trailer or a camper includes a guide rod which is affixed to the outside of the vehicle. The guide rod is located at a level below a doorway of the vehicle, and the guide rod traverses, and extends to a standby location laterally of, the doorway. A step assembly is slidably and pivotally mounted on the guide rod. The step assembly can be slid along the guide rod from a use location in front of the doorway to the standby location laterally of the doorway. From the standby location, the step assembly can be swung on the guide rod into a storage location underneath the vehicle.

33 Claims, 2 Drawing Sheets

STEPPING STRUCTURE FOR VEHICLES AND METHOD OF USE

BACKGROUND OF THE INVENTION

1. Field of the Invention

The invention relates to a structure for stepping into and out of vehicles.

2. Description of the Related Art

Vehicles such as campers, trailers, mobile homes and certain types of construction vehicles are difficult to enter and exit without assistance due to their high clearances. Accordingly, various stepping structures have been proposed to facilitate ingress and egress.

U.S. Pat. No. 3,370,865 discloses a stair for climbing into and out of a trailer. The stair is mounted in front of a door of the trailer and can be swung up and to the side into a storage area.

U.S. Pat. No. 3,406,984 teaches a stepping structure in which a storage compartment for a stair assembly is mounted on the bottom of a camper. In use, the stair assembly is pulled out and bolted to the storage compartment for support.

U.S. Pat. No. 3,756,622 illustrates a stair assembly which is slidable between an extended position and a retracted position on a support structure mounted on a vehicle frame.

U.S. Pat. No. 4,053,172 describes a ladder for climbing onto and down from a construction vehicle. The ladder, which is permanently suspended from the construction vehicle, includes two pivots which allow the ladder to yield in two mutually perpendicular planes upon striking an object.

U.S. Pat. No. 4,073,502 discloses an assembly in which an operating mechanism for an extensible and retractable step is housed beneath an entrance to a motor home. The operating mechanism, which is activated by the vacuum of the motor home engine, swings the step to and from a storage location underneath the motor home entry.

U.S. Pat. No. 4,093,257 teaches a ladder assembly for a flatbed truck. The assembly includes a support frame which is secured to the underside of the truck bed, and a ladder which is pivotally connected to the support frame for movement between an extended position and a collapsed position.

U.S. Pat. No. 4,108,457 illustrates a stepping structure for a camper. The stepping structure comprises a frame which is fixed to the rear of the camper, and the frame supports a pair of steps which can be folded against and secured to the frame.

Common to all of the above stepping structures, which include storable step assemblies, is the fact that in the storage position at least part of the assembly is directly in front of or underneath the door served by the assembly. This is not always advantageous. Moreover, it would be desirable if the storable step assemblies with more than one step could be simplified. It would also be desirable for a step assembly to be storable relatively easily without unduly reducing the clearance of a vehicle served by the assembly.

SUMMARY OF THE INVENTION

It is an object of the invention to provide a stepping structure which does not require any part of a step assembly to be stored in front of or beneath an entry served by the assembly.

Another object of the invention is to provide a construction which allows a step assembly with more than one step to have a relatively simple design.

A further object of the invention is to provide a construction which makes it possible to store a step assembly relatively easily without an excessive reduction in the clearance of a vehicle served by the assembly.

An additional object of the invention is to provide a method which enables a step assembly to be stored in its entirety at a location neither confronting nor underlying an entry served by the assembly.

It is also an object of the invention to provide a method which permits a step assembly to be stored in a relatively simple fashion without unduly reducing the clearance of a vehicle served by the assembly.

The preceding objects, as well as others which will become apparent as the description proceeds, are achieved by the invention.

One aspect of the invention resides in a stepping structure for entering and exiting vehicles. The structure comprises an elongated guide, and an assembly having at least one step for ascent and descent along a predetermined direction. The assembly is movable along the guide in a second direction unparallel to the predetermined direction.

By designing the step assembly to be shiftable in a direction differing from that in which the assembly is ascended and descended, the assembly can be moved away from a location of use. Consequently, it becomes possible to store the entire assembly at a location which does not face or underlie an entry served by the assembly.

An additional aspect of the invention resides in a method of entering or leaving a vehicle. The method comprises positioning a step adjacent the vehicle at a first location so that the step is in an extended position for ascent to or descent from the vehicle, and shifting the step on the vehicle to a second location laterally of the first location. Shifting of the step is preferably accomplished by sliding the step along the vehicle.

The method can further comprise moving the step to a retracted position, and such moving can involve pivoting the step. The method may also include locking the step in the retracted position.

The method can additionally comprise moving the step from the second location to a storage location and this may again involve pivoting the step. The method may further include locking the step in the storage location.

Another aspect of the invention resides in a stepping structure which comprises at least one step having a tread, and a frame-like section defining an opening.

The frame-like section of the step makes it possible for the stepping structure to have a relatively simple design even when the structure has a second step in addition to the first step with the frame-like section. For example, the frame-like section can be connected to a pair of supports which are essentially perpendicular to the first step when this step is in a position of use. The second step may be mounted above the frame-like section on the same pair of supports as the first step with the tread of the first step projecting beyond the second step. Such an arrangement allows the supports to have a simple, essentially flat construction.

A further aspect of the invention resides in a stepping structure which comprises an assembly having a pair of spaced supports, and at least one step mounted on the supports. At least one of the supports is provided with a socket for accommodating a portion of a vehicle.

The socket enables the step assembly to be at least partly recessed in the structure of the vehicle. Accordingly, it becomes possible to store the assembly on the vehicle without excessively reducing the clearance of the vehicle.

One more aspect of the invention resides in a method of entering or leaving a vehicle which comprises, as above, positioning a step adjacent the vehicle at a first location so that the step is in an extended position for ascent to or descent from the vehicle. The method here further comprises moving the step from the first location to a storage location.

Additional features and advantages of the invention will be apparent from the following detailed description of preferred embodiments when read in conjunction with the accompanying drawings.

DESCRIPTION OF THE PREFERRED EMBODIMENTS

Figure 1:
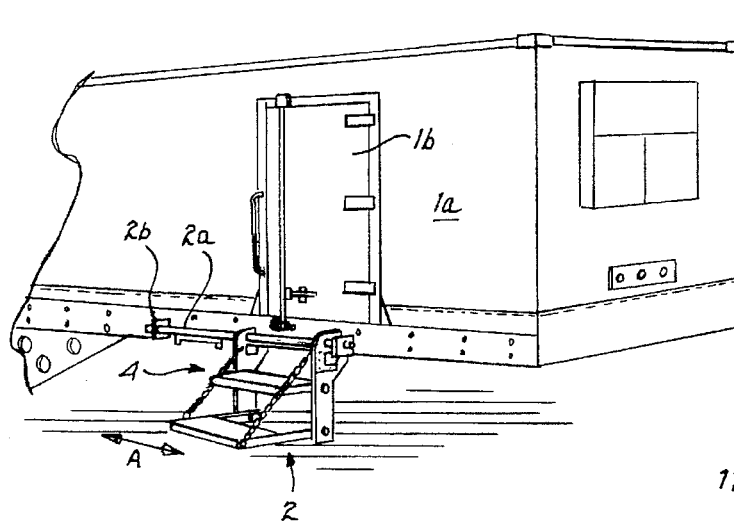
FIG. 1 is a schematic perspective view of a trailer with a stepping structure in accordance with the present invention, the stepping structure including a step assembly which is pivotable into and out of a storage location and is provided with extensible and retractable steps.

Referring to FIG. 1, the numeral 1 identifies a trailer having a side wall 1a with an entry or doorway 1b. A trailer is depicted by way of example only and the invention is applicable to any vehicle whose clearance from the ground is such that convenient ingress and egress require a structure with one or more steps. For instance, the trailer 1 could be a motorized mobile home or a camper.

The trailer 1 is equipped with a stepping structure 2 for entering and leaving the trailer 1 via the trailer doorway 1b. The stepping structure 2 allows a person to easily climb to the trailer doorway 1b from the ground, and vice versa.

The stepping structure 2 includes an elongated guide in the form of a rod 2a which is affixed to the trailer side wall 1a at a level below the trailer doorway 1b. The guide rod 2a is generally perpendicular to the direction in which the stepping structure 2 is ascended and descended, as well as to the direction in which the trailer 1 is entered and exited through the trailer doorway 1b. The guide rod 2a, which extends across the trailer doorway 1b to a location laterally of the trailer doorway 1b, is mounted on the trailer side wall 1a by means of two mounting brackets 2b which are secured to the trailer 1 in any suitable manner, e.g., by welding.

Figure 4:
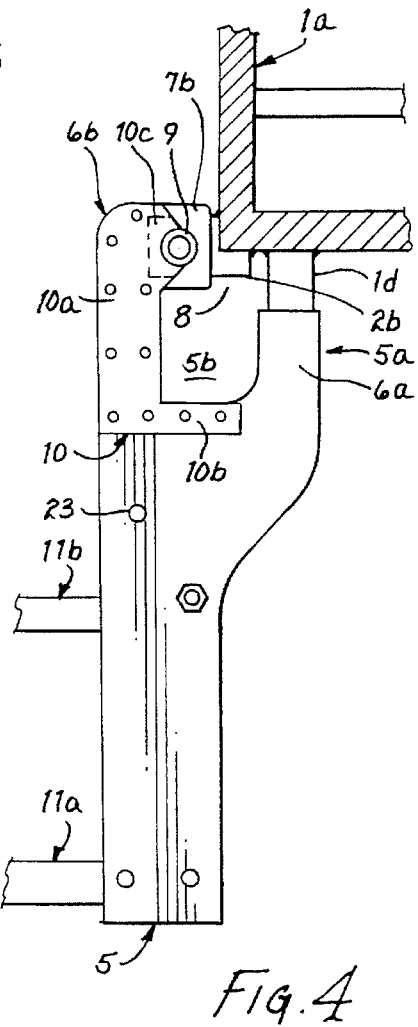
FIG. 4 is a fragmentary sectional view per the arrows 4—4 of FIG. 2.
Figure 6:
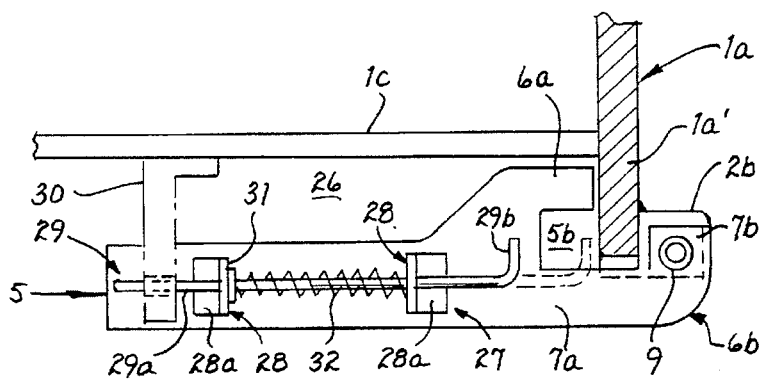
FIG. 6 is a side view showing the step assembly of FIG. 1 being held in the storage location by a locking device forming part of the step assembly.
Figure 6A:
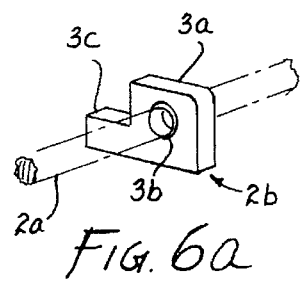
FIG. 6a is a perspective view of a device for mounting a guide rod constituting part of the stepping structure of FIG. 1 on the trailer.

One of the brackets 2b is shown in FIG. 6a. The illustrated bracket 2b is a plate-like member having a mounting portion 3a which is provided with a bore 3b for the guide rod 2a. A projection 3c extends from the mounting portion 3a, and the mounting portion 3a and projection 3c have mutually perpendicular faces which abut mutually perpendicular surfaces of the trailer side wall 1a as seen in FIGS. 4 and 6. End caps or other suitable abutments are disposed on the ends of the guide rod 2a to retain the guide rod 2a in the brackets 2b.

The stepping structure 2 further includes a step assembly 4 which is slidable back-and-forth along the guide rod 2a as indicated by the double-headed arrow A in FIG. 1. The step assembly 4 is also pivotable back-and-forth on the guide rod 2a.

With reference to FIGS. 2, 3, 4 and 5, the step assembly 4 comprises two parallel supports 5 which are spaced from one another longitudinally of the guide rod 2a. The supports 5 include flat main plates which resemble wrenches, and each of the supports 5 has an enlarged, bifurcated end 5a with a socket or cavity 5b. Each of the bifurcated ends 5a has a pair of legs 6a and 6b. The legs 6a are relatively short and essentially straight. The legs 6b are longer than the legs 6a and generally L-shaped, and each of the legs 6b includes a longer arm 7a and a shorter arm 7b. The longer arms 7a are parallel to, and have lengths greater than those of, the short legs 6a. The shorter arms 7b, which are normal to the longer arms 7a, are disposed beyond the free ends of the short legs 6a and extend across part of the distance between the longer arms 7a and the short legs 6a. Accordingly, gaps 8 exist between the shorter arms 7b and the short legs 6a. The short legs 6a and shorter arms 7b have essentially flat end faces which are disposed in mutually perpendicular planes.

Each of the shorter arms 7b is formed with a hole 9 which receives the guide rod 2a in such a manner that the supports 5 are slidable and pivotable on the guide rod 2a. To this end, the holes 9 can be provided with bearings or bushings.

Generally L-shaped reinforcing plates 10 are mounted on the bifurcated ends 5a of the supports 5 and include main arms 10a which are juxtaposed with the longer arms 7a. A secondary arm 10b extends perpendicular to each main arm 10a and borders the adjacent socket 5b on the side thereof opposite the respective shorter arm 7b. Each of the reinforcing plates 10 further includes an approximately V-shaped nose or protrusion 10c which projects from the main arm 10a to the respective hole 9. The reinforcing plates 10 can, for instance, be riveted to the bifurcated ends 5a.

Figure 2:
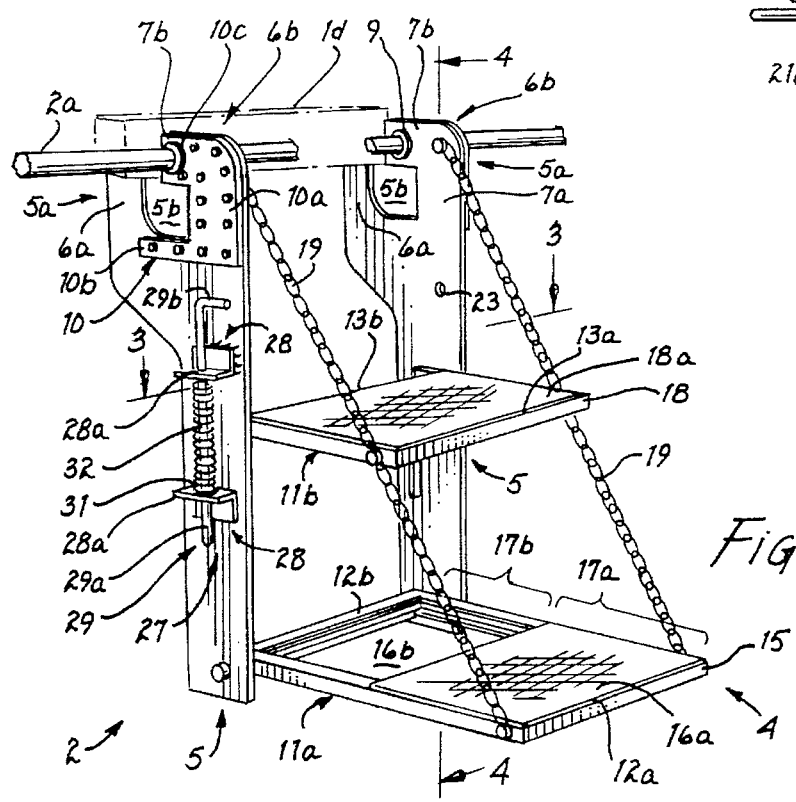
FIG. 2 is a perspective view showing the step assembly of FIG. 1 with the steps in the extended position.
Figure 3:
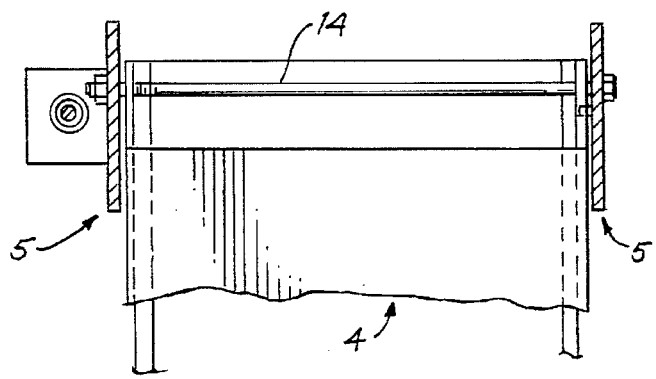
FIG. 3 is a fragmentary sectional view per the arrows 3—3 of FIG. 2.
Figure 5:
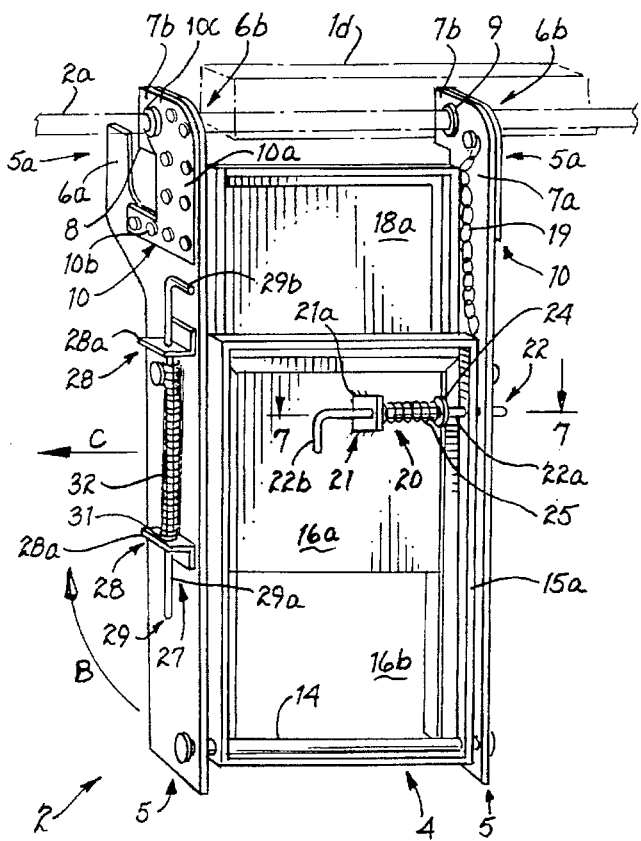
FIG. 5 is a perspective view showing the step assembly of FIG. 1 with the steps in the retracted position.

A generally flat lower step 11a and a generally flat upper step 11b are pivotally mounted on the supports 5 for movement between an extended position shown in FIG. 2 and a retracted position shown in FIG. 5. In the extended positions, the steps 11a, 11b have an essentially horizontal orientation and are perpendicular to the supports 5 which extend substantially vertically.

The step 11a has a front marginal portion 12a and a rear marginal portion 12b while the step 11b has a front marginal portion 13a and a rear marginal portion 13b. The rear marginal portions 12b, 13b are confined intermediate the supports 5 in both the extended and retracted positions. In the extended positions, the steps 11a, 11b project from the supports 5 in a direction away from the short legs 6a of the bifurcated ends 5a so that the front marginal portions 12a, 13a are remote from the supports 5. The rear marginal portions 12b, 13b are mounted on pivots or rods 14 which bridge the supports 5 and are perpendicular thereto. The pivots 14 pass through orifices in the supports 5, and the ends of the pivots 14 are provided with end caps or other suitable abutments to hold the pivots 14 on the supports 5. The pivots 14 support the steps 11a, 11b for swinging movement between the extended and retracted positions. To this end, bearings or bushings can be disposed in the orifices of the supports 5.

The lower step 11a comprises a rectangular rim 15 which carries a rectangular, slip resistant tread 16a designed to support a person ascending or descending the stepping structure 2. The tread 16a, which traverses the width of the lower step 11a, is located in a front section 17a of the lower step 11a. Thus, the tread 16a does not span the entire length of the lower step 11a but extends from the front marginal portion 12b of the lower step 11a only partway to the rear marginal portion 12a. A frame-like rear section 17b of the lower step 11a is contiguous to the front section 17a and has a rectangular opening 16b which is framed by the rim 15 and the tread 16a.

The upper step 11b has a rectangular rim 18 which supports a rectangular, slip resistant tread 18a designed to carry a person ascending or descending the stepping structure 2. In the extended positions, the step 11b overlies at least part of the opening 16b in the lower step 11a.

The steps 11a, 11b are held in the extended positions by a pair of chains 19. The chains 19 have first ends which are secured to the legs 6b of the supports 5 at or near the junctures of the longer and shorter arms 7a, 7b. The first end of each chain 19 is affixed to that major surface of the respective support 5 which faces the other support 5. The chains 19 further have second ends which are connected to the rim 15 of the lower step 11a at or near the front marginal portion 12a, and on opposite sides, of the lower step 11a. Each of the chains 19 is also attached to the rim 18 of the upper step 11b at a location of the respective chain 19 approximately midway between the first and second ends thereof. The chains 19 are secured to the rim 18 of the upper step 11b at or near the front marginal portion 13a, and on opposite sides, of the upper step 11b. In the extended positions, the chains 19 make acute angles with the supports 5.

In the retracted positions of FIG. 5, the lower step 11a partially overlaps the upper step 11b. A locking device 20 is mounted on the bottom of the lower step 11a to hold the steps 11a,11b in the retracted positions.

Figure 7:
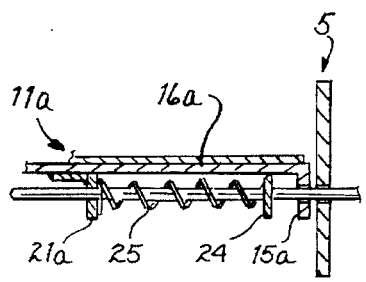
FIG. 7 is a sectional view per the arrows 7—7 of FIG. 5.

With reference to FIGS. 5 and 7, the rim 15 of the lower step 11a has a section 15a which runs the length of the lower step 11a on one side of the latter and extends from the front marginal portion 12a to the rear marginal portion 12b of the lower step 11a. The locking device 20 includes a bracket 21 which is fixed to the lower surface of the tread 16a of the lower step 11a. The bracket 21 includes a plate-like portion 21a which is parallel to the section 15a of the rim 15, and the plate-like bracket portion 21a is provided with an aperture. The locking device 20 further includes a pin or pin-like member 22 having a shaft 22a and a handle 22b, and the pin shaft 22a passes through the aperture in the plate-like bracket portion 21a. The handle 22b of the pin 22 is located on the side of the plate-like bracket portion 21a remote from the rim section 15a, and the pin shaft 22a is in line with and normal to the rim section 15a.

The rim section 15a is provided with an aperture which registers with the aperture in the plate-like bracket portion 21a. An additional aperture 23, best seen in FIGS. 2 and 4, is formed in the support 5 which is adjacent the rim section 15a. The aperture 23 is positioned in such a manner that, in the retracted position of the lower step 11a, the aperture 23 is in alignment with the apertures in the plate-like bracket portion 21a and the rim section 15a. The lower step 11a can thus be prevented from moving out of the retracted position by advancing the pin 22 so that the pin shaft 22a extends through the aperture in the rim section 15a and the aperture 23 in the neighboring support 5. Since the lower step 11a overlaps the upper step 11b in the retracted positions of the steps 11a,11b, the upper step 11b is likewise unable to move from its retracted position to its extended position when the lower step 11a is locked in the retracted position by the locking device 20.

A washer or washer-like member 24 is fixed to the pin shaft 22a at a location between the plate-like bracket portion 21a and the rim section 15a. A spring or biasing member 25 surrounds the pin shaft 22a and is confined between the plate-like bracket portion 21a and the washer 24. The plate-like bracket portion 21a and the washer 24 constitute abutments for the spring 25. The spring 25 bears against the plate-like bracket portion 21a and the washer 24 so as to urge the pin shaft 22a towards the locking position in which the pin shaft 22a extends through the aperture 23 of the adjoining support 5.

As mentioned previously, the step assembly 4 is shiftable along the guide rod 2a perpendicular to the direction in which the steps 11a,11b are ascended and descended, and perpendicular to the direction in which the trailer doorway 1b is entered and exited. Hence, the step assembly 4 can be moved from a use location directly in front of the trailer doorway 1b to a standby location laterally of the trailer doorway 1b. A storage location for the step assembly 4 is formed underneath the trailer 1 behind the standby location.

The storage location is shown at 26 in FIG. 6 where the numeral 1c denotes the bottom of the trailer 1. A lower marginal portion 1a' of the side trailer wall 1a projects down beyond the trailer bottom 1c, and the storage location 26 is located behind the lower marginal portion 1a' and beneath the trailer bottom 1c. The step assembly 4 is brought into the storage location 26 by pivoting the step assembly 4 in the direction of the arrow B of FIG. 5 after the step assembly 4 has been placed in the standby location laterally of the trailer doorway 1b. As the step assembly 4 is pivoted backwards in the direction of the arrow B, the lower marginal portion 1a' of the trailer side wall 1a enters the sockets 5b of the supports 5. Accordingly, when the step assembly 4 is in storage as illustrated in FIG. 6, the lower marginal portion 1a' is received in the sockets 5b.

A locking device 27 is provided on one of the supports 5 to hold the step assembly 4 in the storage location. With reference to FIGS. 2, 5 and 6, the locking device 27 is mounted on the major surface of the respective support 5 which faces away from the steps 11a,11b. The locking device 27 includes two brackets 28 which are spaced from one another longitudinally of the support 5. Each of the brackets 28 includes a plate-like portion 28a which is normal to the plane of the support 5. The plate-like bracket portions 28a are in line with one another and are formed with registering apertures. The locking device 27 further includes a pin or pin-like member 29 having a shaft 29a and a handle 29b, and the pin shaft 29a passes through the registering apertures in the plate-like bracket portions 28a. The pin handle 29b is located on the side of the brackets 28 nearest the bifurcated end 5a of the respective support 5.

An additional bracket 30 is situated in the storage location 26 for the step assembly 4 and is mounted on the lower surface of the trailer bottom 1c. The bracket 30 comprises a plate-like portion 30a which is perpendicular to the trailer bottom 1c and parallel to the trailer side wall 1a. The plate-like bracket portion 30a has an aperture positioned in such a manner that, when the step assembly 4 is in the storage location 26, the aperture in the plate-like bracket portion 30a is in alignment with the apertures in the plate-like portions 28a of the brackets 28. The step assembly 4 can thus be prevented from swinging out of the storage location 26 by advancing the pin 29 so that the pin shaft 29a extends through the aperture in the plate-like portion 30a of the bracket 30.

A washer or washer-like member 31 is fixed to the pin shaft 29a at a location between the plate-like portions 28a of the brackets 28. A spring or biasing member 32 surrounds the pin shaft 29a and is confined between the washer 31 and one of the plate-like bracket portions 28a. The washer 31 and this plate-like bracket portion 28a constitute abutments for the spring 32. The spring 32 bears against the washer 31 and such plate-like bracket portion 28a so as to urge the pin shaft 29a towards the locking position in which the pin shaft 29a extends through the aperture of the bracket 30. FIG. 6 shows the locking position of the pin 29 in full lines and the release position of the pin 29 in broken lines.

The operation of the stepping structure will be described assuming that the step assembly 4 is at the use location in front of the trailer doorway 1b and that the steps 11a, 11b are in the extended positions. Under these conditions, the supports 5 are essentially vertical and the steps 11a, 11b are essentially horizontal. As illustrated in FIGS. 2, 4 and 5, the flat end faces of the short legs 6a of the supports 5 bear against a beam 1d mounted under the trailer doorway 1b to prevent the step assembly 4 from swinging underneath the trailer 1 when weight is applied to the steps 11a, 11b.

When the step assembly 4 is no longer needed and is to be stored, e.g., for travel, the steps 11a, 11b are pivoted upward to their retracted positions. The pin 22 is advanced so that the pin shaft 22a extends through the aperture 23 of the support 5 which cooperates with the locking device 20. This action locks the steps 11a, 11b in the retracted positions.

The step assembly 4 is now slid along the guide rod 2a in the direction of the arrow C of FIG. 5 in order to move the step assembly 4 from the use location in front of the trailer doorway 1b to the standby location laterally of the trailer doorway 1b and in front of the storage location 26. Once the step assembly 4 is in the standby location, the step assembly 4 is swung upwards in the direction of the arrow B of FIG. 5 and into the storage location 26. As the step assembly 4 advances into the storage location 26, the lower marginal portion 1a' of the trailer side wall 1a enters the sockets 5b of the supports 5. Upon arrival of the step assembly 4 in the storage location 26, the pin 29 of the locking device 27 is advanced so that the pin shaft 29a enters the aperture in the bracket 30 of the trailer 1. In this manner, the step assembly 4 is locked in the storage location 26.

When the step assembly 4 is again needed, the pin 29 is retracted to withdraw the pin shaft 29a from the aperture in the bracket 30. This releases the step assembly 4 from the storage location 26, and the step assembly 4 is thereupon pivoted downward towards the standby location in a direction counter to the arrow B of FIG. 5. During this downward movement, the lower marginal portion 1a' of the trailer side wall 1a leaves the sockets 5b of the supports 5.

After the step assembly 4 has been swung downward to the standby location, the step assembly 4 is slid along the guide rod 2a towards the use location in a direction counter to the arrow C of FIG. 5. Once the step assembly 4 has reached the use location directly in front of the trailer doorway 1b, the pin 22 is retracted to remove the pin shaft 22a from the aperture 23 in the cooperating support 5. This causes the steps 11a, 11b to be released from their retracted positions, and the steps 11a, 11b are then pivoted downward to the extended positions.

The guide rod 2a allows the step assembly 4 to be stored laterally of the trailer doorway 1b when this is of advantage.

The design of the lower step 11a with a frame-like section 17b makes it possible for the step assembly 4 to have a relatively simple design. Thus, the frame-like section 17b permits the upper step 11b to be mounted on the same supports 5 as the lower step 11a even though the supports 5 are perpendicular to the lower step 11a when the latter is in its extended position. This, in turn, allows the supports 5 to have a simple, essentially flat construction.

The sockets 5b of the supports 5 enable the step assembly 4 to be partly recessed in the structure of the trailer 1 so that the step assembly 4 does not significantly reduce the clearance of the trailer 1 when the step assembly 4 is in the storage location 26.

Various modifications are possible within the meaning and range of equivalence of the appended claims.

What is claimed is:

1. A stepping structure for entering and exiting vehicles comprising in combination:

an elongated guide; and an assembly coupled to said guide and having at least one step for ascent and descent along a predetermined direction, said assembly being movable along said guide in a second direction substantially perpendicular to said predetermined direction said assembly having a pair of spaced supports, and said at least one step mounted on said supports, at least one of said supports being provided with a socket for accommodating a portion of a vehicle, said one support has a bifurcated end which includes a first leg and a second leg, said socket being located between said legs, said first leg is substantially L-shaped and includes a longer arm and a shorter arm, said longer arm being substantially parallel to, and said shorter arm projecting from said longer arm towards, said second leg.

2. The structure of claim 1 wherein said guide comprises a rod shaped member.

3. The structure of claim 1 wherein at least one of said supports comprises a plate shaped member.

4. The structure of claim 1 wherein said supports are mounted on said guide for sliding movement between a first location and a second location, said supports also being mounted on said guide for pivotal movement to and from a storage position.

5. The structure of claim 4 wherein said first leg is slidably and pivotally connected to said guide.

6. The structure of claim 5 wherein said one support comprises a plate shaped main member which includes said legs, and a plate shaped reinforcing member on said first leg.

7. The structure of claim 1 wherein said shorter arm is slidably and pivotally connected to said guide.

8. The structure of claim 1 wherein said one step is mounted on said supports for movement between an extended position and a retracted position, said assembly further comprising means for locking said one step in said retracted position.

9. The structure of claim 8 wherein said one step is pivotable between said extended position and said retracted position.

10. The structure of claim 8 wherein said locking means comprises a locking member on said one step having a locking position in which said locking member is engageable with one of said supports.

11. The structure of claim 10 wherein said one support is provided with an aperture and said locking member comprises a pin-shaped element which is receivable by said aperture in said locking position.

12. The structure of claim 10 wherein said assembly further comprises means for urging said locking member towards said locking position.

13. The structure of claim 12 wherein said one step is provided with a first abutment and said locking member is provided with a second abutment, said urging means including a spring which is mounted on said locking member and bears against said abutments.

14. The structure of claim 8 wherein said assembly further comprises means for holding said one step in said extended position.

15. The structure of claim 14 wherein said holding means comprises a chain which is connected to said one step and to one of said supports.

16. The structure of claim 1 wherein said supports are movable to and from a storage position.

17. The structure of claim 16 wherein said assembly further comprises means for locking said supports in said storage position.

18. The structure of claim 17 wherein said locking means comprises a locking member on one of said supports having a locking position in which said locking member is engageable with a vehicle.

19. The structure of claim 18 wherein said locking member comprises a pin shaped element which is receivable in an aperture of a vehicle.

20. The structure of claim 18 wherein said assembly further comprises means for urging said locking member towards said locking position.

21. The structure of claim 20 wherein said one support is provided with a first abutment and said locking member is provided with a second abutment, said urging means including a spring which is mounted on said locking member and bears against said abutments.

22. The structure of claim 1 wherein said one step comprises a tread, and a frame section defining an opening.

23. The structure of claim 22 wherein said frame section is connected to said supports, said one step having an extended position, and said tread being remote from said supports in said extended position.

24. The structure of claim 23 wherein said assembly comprises an additional step on said supports, said additional step having an extended position and including an additional tread, and said additional tread overlying said opening when each step is in said extended position.

25. The structure of claim 23 wherein said one step defines a plane which is substantially normal to said supports in said extended position.

26. A stepping structure for entering and exiting vehicles comprising an assembly having a pair of spaced supports, and at least one step mounted on said supports, at least one of said supports being provided with a socket for accommodating a portion of a vehicle, said one support has a bifurcated end which includes a first leg and a second leg, said socket being located between said legs, said first leg is substantially L-shaped and includes a longer arm and a shorter arm, said longer arm being substantially parallel to, and said shorter arm projecting from said longer arm towards, said second leg.

27. The structure of claim 26 wherein said one support comprises a plate shaped member which includes said legs.

28. The structure of claim 27 wherein said one support further comprises a plate shaped reinforcing member on one of said legs.

29. A method of deploying at least one step for entering or leaving a vehicle which comprises:

positioning at least one step adjacent said vehicle at a first location so that said step is in an extended position for ascent to or descent from said vehicle;

shifting said step on said vehicle to a second location laterally of said first location; and moving said step from said second location to a storage location beneath said vehicle.

30. The method of claim 29 which further comprises moving said step to a retracted position.

31. The method of claim 30 wherein said moving said step to said retracted position comprises pivoting said step.

32. The method of claim 30 which further comprises locking said step in said retracted position.

33. The method of claim 29 wherein said shifting comprises sliding said step along said vehicle.

\* \* \* \* \*